Sept. 27, 1960 M. GOLDSHOLL 2,954,119

PHONOGRAPH RECORD ENVELOPE

Filed Nov. 8, 1957

INVENTOR.

Morton Goldsholl

By: Wallenstein & Spangenberg attys.

2,954,119
Patented Sept. 27, 1960

2,954,119

PHONOGRAPH RECORD ENVELOPE

Morton Goldsholl, 201 N. Wells St., Chicago, Ill.

Filed Nov. 8, 1957, Ser. No. 695,355
5 Claims. (Cl. 206—62)

The present invention relates to the packaging of phonograph records of the grooved disc-type and more particularly to an envelope for such records designed to protect the records from damage when not in use and to facilitate the removal thereof from the envelope.

The most frequently used envelope for circular, grooved disc-type phonograph records is a very simple and inexpensive cardboard envelope comprising a pair of opposed cardboard panels, usually of rectangular shape, which are joined at their side and bottom edges and unconnected at their top edges to define an opening through which the record is passed in inserting the record into or removing the record from the envelope. Although it is generally known that it is harmful to the record to touch the grooved portions thereof, the inexpensive type of envelope heretofore constructed made it an exceedingly difficult task to remove the record from the envelope without touching the record grooves. Usually, the user attempted to grasp the ungrooved peripheral band of the record between the first two fingers, but, more often than not, the ends of his fingers would still overlap the record grooves. Moreover, even when the user was successful in removing the record by touching only the ungrooved peripheral band thereof, this resulted in a very insecure grasp upon the record. Perhaps the most secure and safe method of handling the record is to cup the hand and then support the bottom ungrooved center portion of the record with the fingers while engaging and applying an inward pressure against the edge of the record with the thumb.

It is one of the primary objects of the present invention to provide a phonograph record envelope of the inexpensive type which is provided with means for expanding the mouth of the envelope to a degree where the user may insert his hand well into the envelope and grasp the record in the preferred manner above described before it is removed from the envelope. Another object of the present invention is to provide a phonograph record envelope as just described wherein the mouth of the envelope may be expanded to a substantial degree by inexpensive means which does not necessitate the altering of the shape or material out of which record envelopes have been heretofore made.

In accordance with a general aspect of the present invention, the opposed panels of the conventional type of phonograph record envelope are each provided with three score lines forming fold lines arranged in a generally triangular or frusto-triangular fashion. One of the fold lines most advantageously extends generally parallel to the open end and across the medial portion of the envelope which is located opposite the widest portion of the record when fully inserted into the envelope. The other two fold lines converge from the ends of the latter fold line toward the open side of the envelope. By pressing the sides of the envelope inwardly, the portions of the envelope panels within the triangular or frusto-triangular arrangement of fold lines diverge sharply outwardly to provide a large mouth for insertion of the user's hand into the envelope. The opening is such that the finger tips may be placed against the ungrooved center portion of the record without touching the grooved portions thereof.

In accordance with one of the specific features of the invention, the above-mentioned fold line of each envelope panel extending parallel to the open side thereof is curved or bowed toward the latter side. This feature effects a substantial outward bowing of the envelope panels near the center portion of the envelope which is not present to any substantial degree when the fold line is straight, which, however, falls within the broader aspects of the invention. The outward bowing of the envelope panels at the medial portions thereof permits the fingers to be inserted into the envelope to a greater extent, so that a more secure grip may be had on the record.

Other objects, advantages and features of the invention will become apparent when making reference to the specification to follow and the drawings wherein.

Figures 1, 2, 3, 4, 5, 6, 7, 8:
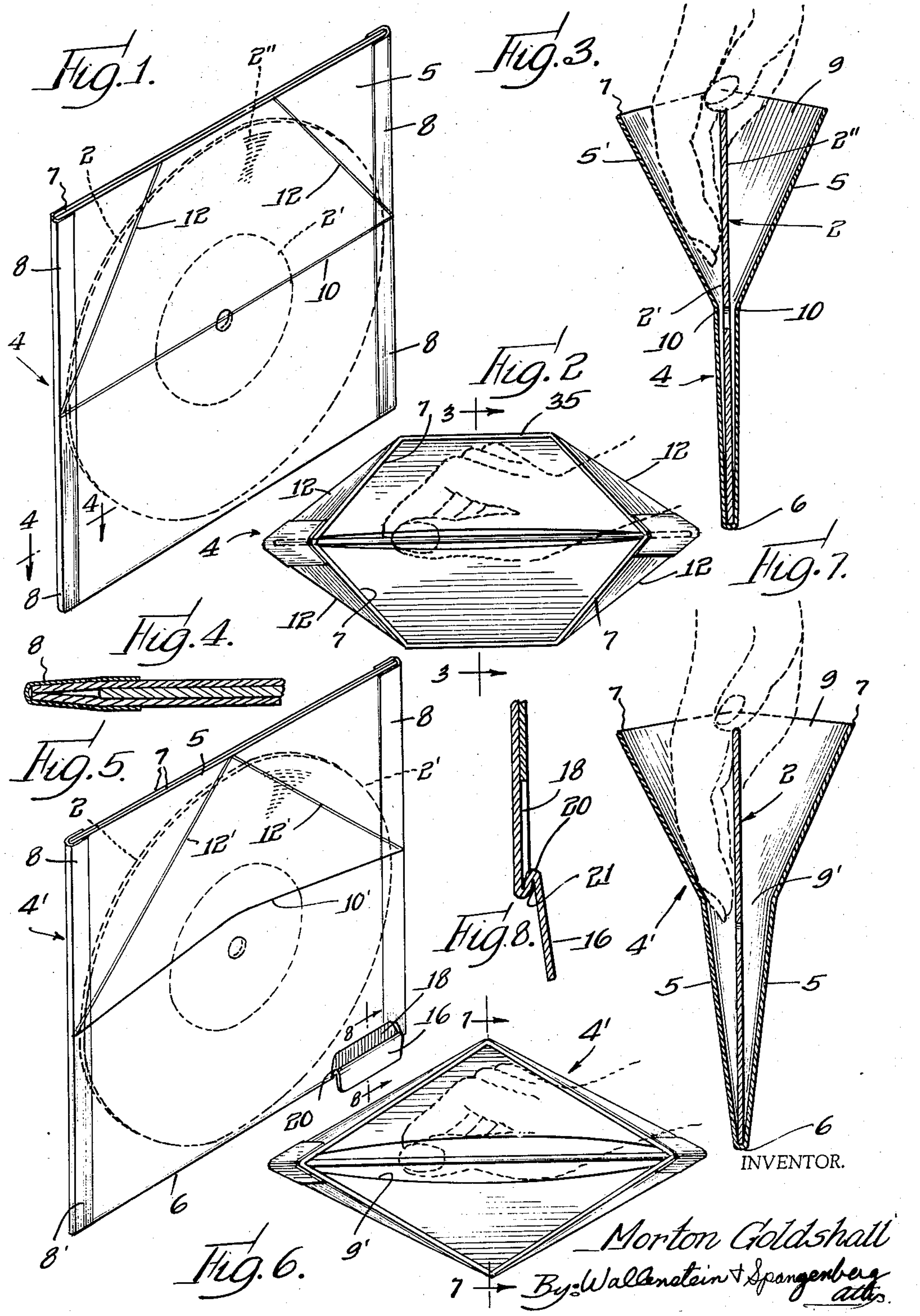
Fig. 1 is a perspective view of one form of phonograph record package utilizing an envelope constructed in accordance with the present invention.
Fig. 2 is a top view of the package of Fig. 1 with the envelope in its opened position.
Fig. 3 is a vertical section through the opened package of Fig. 2, taken along section line 3—3 therein.
Fig. 4 is a fragmentary sectional view through the sides of the package, showing the manner in which the opposed side edges of the envelope panels are secured together.
Fig. 5 is a perspective view of a second and most preferred form of the present invention.
Fig. 6 is a top plan view of the package shown in Fig. 5, with the envelope in its opened position.
Fig. 7 is a vertical sectional view through the opened package shown in Fig. 6, taken along section line 6—6 therein.
Fig. 8 is an enlarged fragmentary sectional view through the portion of the envelope of Fig. 5 showing the index tab formed integrally with one of the envelope panels.

Referring now more particularly to the embodiment of the invention illustrated in Figs. 1 through 4, the package there shown comprises a circular, grooved, disc-type phonograph record 2 having the usual ungrooved circular center portion 2′ and the recording grooves 2″, and an envelope 4 therefor which has been modified in accordance with the present invention. The particular form of envelope illustrated comprises a pair of opposed rectangular panels 5—5 which may be made from a single-piece rectangular cardboard blank folded at the center thereof identified by reference numeral 6. The cardboard may have an outer finished ply upon which may be directly printed the ornamental and informational indicia commonly found on phonograph record envelopes. Alternatively, the present invention may be applied to an envelope construction wherein a separate outer paper covering containing the ornamental and informational indicia is provided, although the present invention is, perhaps, most useful where the outer ply of the cardboard making up the panels 5—5 is directly imprinted upon with this indicia. The sides of the folded blank may be secured together in a variety of ways, such as by use of folded adhesive strips 8—8 which extend around the peripheral side portions of the panels 5—5. The upper or end edges 7—7 of the envelope panels are left unsecured to form an opening 9 into the envelope.

In accordance with the present invention, the opposed panels 5—5 are scored in a particular way such that the envelope may be readily opened wide to enable the user to insert his fingers against the ungrooved center portion of the record 2 without touching the grooved portion of the record. In general, the score lines on each of the panels are identical and follow the outlines of a triangular or frusto-triangular figure. In the embodiment now being described, considering the envelope in a position with the open side up, each of the panels 5—5 has a generally straight, horizontally extending score line 10 formed preferably although not necessarily on the outer surface of the panel and extending most preferably between the center or medial portions of the panel sides. The score line 10 forms a hinge or fold in the associated panel permitting an outward bending of the associated panel above the score line 10.

A pair of preferably straight, upwardly converging score lines 12—12 extend from points adjacent the ends of each of the score lines 10, and they are preferably formed on the same side of the associated panel as the score line 10, so that all lines can be simply scored in a single operation. The score lines 12—12 form additional folds or hinge lines enabling the portion of the associated panel on the outside of the lines 12—12 to fold inwardly, as shown in Fig. 2. Although in accordance with a broader aspect of the invention, score lines 12—12 may intersect at the center of the upper edge of the associated panel, nevertheless, as illustrated, the score lines 12—12 intersect the upper edge of the associated panel at appreciably spaced apart points to give an advantage to be explained as this specification proceeds. Preferably, the lines 12—12 have similar inclinations so that the envelope is symmetrically scored with respect to a vertical center line.

With the construction described, the envelope 4 may be opened wide to the position shown in Figs. 2 and 3. This may be accomplished by holding the envelope edgewise against the user's body and applying an inward pressure against the then outer side edges of the envelope 4 above the score lines 10—10 of the panels 5—5 with one hand, to force the panel portions outside of the score lines 12—12 inwardly, whereupon the poritons of the panels within the score lines 12—12 fold outwardly to form a large mouth defined by outwardly diverging wall portions extending from the score lines 10—10. This makes the ungrooved center portion 2′ of the record 2 readily accessible to the user's hand, as illustrated in Fig. 3. Due to the fact that the opposed panels 5—5 are fairly close together adjacent the center of the record 2, the user's fingers may not be extended readily beyond the widest portion of the record 2. Nevertheless, the record can be grasped for removal from the envelope without touching the record grooves 2″ by cupping the hand slightly and contacting the ungrooved center portion 2′ with the finger tips and the edge of the record with the thumb. Then, the envelope panels are allowed to collapse around the hand inserted in the envelope and the record can be pulled from the envelope or the envelope pulled from the record while the user grasps the closed end of the envelope with the other hand.

It can be shown that, because the score lines 12—12 intersect at the upper edges of the associated envelope panel at widely spaced points, the panel material along the score lines 10—10 will be somewhat further apart during the opening of the envelope because of the reduced strain placed on the panel material. If the envelope panels are drawn too closely together by the expansion or separation of the envelope panels, the record may be so tightly held between the envelope panels that it cannot be removed with relative ease from the envelope.

Refer now to the preferred envelope construction 4′ of Figs. 5–8 wherein the envelope can be opened to a greater extent and the record removed with less effort than the embodiment of Figs. 1–5. Except for the shape and inclination of the score lines, the envelope 4′ is identical to the envelope 4 of Figs. 1–4 and corresponding parts thereof have been similarly numbered.

As there illustrated, the score line 10 of each panel which extends between the centers of the panel sides is curved or bowed toward the open end of the envelope, and scored lines 12′—12′ which converge toward the open end of the envelope intersect at the center of the end edge 7 of the panel involved, although it is within the purview of the form of the invention now being described to separate the fold lines 12′—12′ as in the embodiment of Figs. 1–4. The bowing of the score lines 10′—10′ causes the envelope material adjacent the same to bow outwardly a substantial amount when the envelope is opened, to form an appreciable opening 9′ at the center of the envelope (see Figs. 6 and 7). This permits the user's hand to be inserted a greater distance into the envelope which permits a more secure grip upon the record. What is of still more importance however, is that there is less binding or area of contact between the record and the envelope so that the record can be removed more easily from the envelope.

The intersection of the score lines 12′—12′ at the center of the end edges 7—7 of the envelope provides a much larger opening 9 into the envelope than does the separation of the score lines. Since the bowing of the score lines 10′—10′ has minimized the binding problem, no particular advantage would be obtained by separating the score lines 12′—12′.

The envelope of Figs. 5–8 is additionally provided with an index flap or tab 16 which may be struck from one of the opposed panels 5—5. Information identifying the record involved may be placed in small print upon the index flap 16 so that, when the envelope is inserted vertically between a pair of records in the manner so that the tap 16 projects horizontally therefrom, the title of the record is visible. As illustrated, the flap is formed by an inverted U-shaped cut-out portion 18 near the folded portion of the envelope blank, and a hinge 20 is formed by a score line 21 which is parallel and spaced from the folded or closed end of the envelope. In the embodiment illustrated, when storing the record envelopes on a shelf, the normally open top side of the envelope is placed on the shelf so that it faces horizontally to the rear of the shelf.

It should be understood that numerous modifications may be made of the preferred forms of the envelopes above described without deviating from the broader aspects of the present invention.

I claim as my invention:

1. In combination, a circular disc-type phonograph record and an envelope enclosing said record comprising: opposed panels of semi-rigid material connected together along their corresponding side and bottom edges and unconnected along their upper edges to form an opening into the envelope, and said opposed panels having corresponding opposed fold lines formed therein extending generally horizontally across the medial portions thereof where at least the ends thereof are located opposite the widest portion of the record when fully inserted into said envelope, and said opposed panels each having corresponding fold lines converging upwardly from the end portions of the horizontally extending fold line, an inward force applied to the side edges of the envelope above said horizontally extending fold lines causing the panel material between said converging fold lines to diverge sharply outwardly to form a wide mouth.

2. In combination, a circular disc-type phonograph record and an envelope enclosing said record comprising: opposed panels of semi-rigid material connected together along their corresponding side and bottom edges and unconnected along their upper edges to form an opening into the envelope, and said opposed panels having corresponding opposed, upwardly bowed fold lines formed therein extending generally horizontally across the medial portions thereof where at least the ends thereof are located opposite the widest portion of the record when fully inserted into said envelope, and said opposed panels each having corresponding fold lines converging upwardly from the end portions of the associated horizontally extending fold line, an inward force applied to the side edges of the envelope above and horizontally extending fold lines causing the panel material between said converging fold lines to diverge sharply outwardly to form a wide mouth.

3. In combination, a circular disc-type phonograph record and an envelope enclosing said record comprising: generally rectangular opposed panels of semi-rigid material connected together along their corresponding side and bottom edges and unconnected along their upper edges to form an opening into the envelope, and said opposed panels having corresponding opposed fold lines formed therein extending generally horizontally across the medial portions thereof where at least the ends thereof are located opposite the widest portion of the record when fully inserted into said envelope, and said opposed panels each having corresponding straight fold lines converging upwardly from the end portions of the associated horizontally extending fold line and meeting the top edge thereof at points spaced substantially from the center of the top edge whereby an inward force applied to the side edges of the envelope above said horizontally extending fold lines will cause the panel material between said converging fold lines to diverge sharply outwardly to form a wide mouth into the envelope.

4. In combination, a circular grooved disc phonograph record and an envelope enclosing said record comprising: generally rectangular opposed panels of semi-rigid material connected together along their corresponding side and bottom edges and unconnected along their upper edges to form an opening into the envelope, and said opposed panels having corresponding opposed fold lines formed therein extending generally horizontally across the portion of said panels opposite the widest portion of said record with the latter fully inserted in the envelope, and said opposed panels each having corresponding fold lines converging upwardly from the end portions of the associated horizontally extending fold line, an inward force applied to the side edges of the envelope above said horizontally extending fold lines causing the panel material between said converging fold lines to diverge sharply outwardly to form a wide mouth.

5. In combination, a circular grooved disc phonograph record and an envelope enclosing said record comprising: generally rectangular opposed panels of semi-rigid material connected together along their corresponding side and bottom edges and unconnected along their upper edges to form an opening into the envelope, and said opposed panels having corresponding opposed upwardly bowed fold lines formed therein extending generally horizontally across the portion of said panels opposite the widest portion of said record with the latter fully inserted in the envelope, and said opposed panels each having corresponding fold lines converging upwardly from the end portions of the associated horizontally extending fold line and meeting at the center of the top edge thereof, an inward force applied to the side edges of the envelope above said horizontally extending fold lines causing the panel material between said converging fold lines to diverge sharply outwardly to form a wide mouth providing clearance for insertion of a hand into the central portion of the envelope without touching the grooves of the record.

References Cited in the file of this patent

UNITED STATES PATENTS 1,245,610 O'Brien ---------------- Nov. 6, 1917
2,176,912 Luckett ---------------- Oct. 24, 1939
2,827,223 Allison ---------------- Mar. 18, 1958

FOREIGN PATENTS

461 Great Britain ---------------- 1900